United States Patent

[11] 3,546,349

| [72] | Inventors | Karl Swoboda<br>Vienna;<br>Otmar Kleinhagauer, Kapfenberg, Austria |
|---|---|---|
| [21] | Appl. No. | 794,955 |
| [22] | Filed | Jan. 29, 1969 |
| [45] | Patented | Dec. 8, 1970 |
| [73] | Assignee | Gebr. Bohler & Co.<br>Kapfenberg, Austria |
| [32] | Priority | Feb. 6, 1968 |
| [33] | | Austria |
| [31] | | No. A1103/68 |

[54] PROCESS AND APPARATUS FOR USE IN THE ELECTRIC SLAG REFINING OF METALS
6 Claims, 1 Drawing Fig.

[52] U.S. Cl. ............................................ 13/34
[51] Int. Cl. ....................................... F27d 23/00
[50] Field of Search ............................... 13/2, 9, 9X, 31, 31X, 34; 75/11, 12, 10; 164/44, 52

[56] References Cited
UNITED STATES PATENTS

| 2,804,295 | 8/1957 | Brooke | 75/44 |
| 3,197,539 | 7/1965 | Hinds | 13/2X |
| 3,226,102 | 12/1965 | Pagonis | 75/10X |
| 3,234,608 | 2/1968 | Peras | 164/52 |

Primary Examiner—G. Harris
Assistant Examiner—Roy N. Envall, Jr.
Attorney—Arthur O. Klein ABSTRACT: A plurality of electrodes consisting of the metal to be remelted are fused in succession in a mold under a slag layer. Each of said electrodes is strongly preheated before it is introduced into said slag layer at least at that end portion of said electrode at which the same is to be introduced into said slag layer.

PATENTED DEC -8 1970
3,546,349
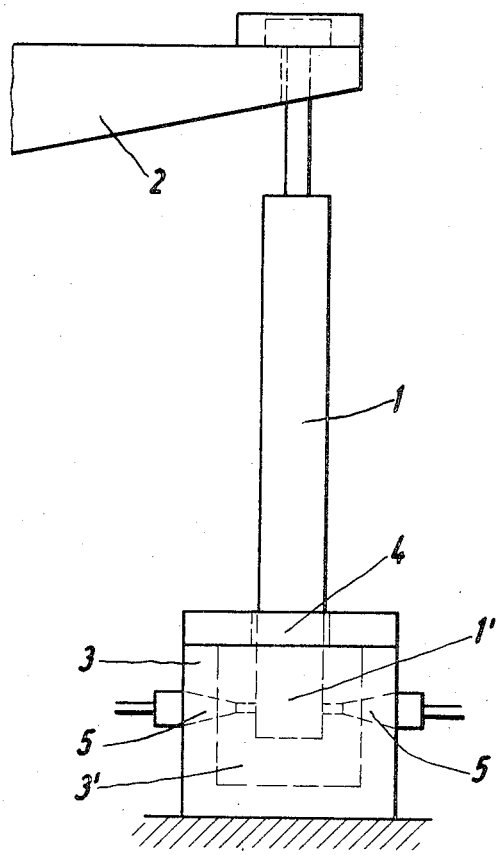
*Inventors:*
Karl SWOBODA
Otmar KLEINHAGAUER
by: *Arthur O. Klein,* their Attorney

PROCESS AND APPARATUS FOR USE IN THE ELECTRIC SLAG REFINING OF METALS

This invention relates to a slag refining process for metal, particularly of steel, in which process electrodes consisting of the metal to be remelted are successively fused down in a mold under a slag layer, and apparatus for carrying out the process.

With the aim to develop the electric slag refining process and improve its efficiency, it is desired to produce steel ingots which have been made from a plurality of electrodes that have been fused down in succession. When the heat developed by the electric current flowing out of an electrode during the remelting process has fused down said electrode except for a short remainder, the same must be pulled out of the mold in that the electrode holder is lifted, and must be replaced by a new electrode. The electrode holder is then lowered to introduce said new electrode into the mold. The new electrode is subsequently fused down. It is usual to supply electric electric current through so-called auxiliary electrodes during the operation which has been described hereinbefore so that the molten metal in the mold and the molten slag layer floating on the molten metal do not cool down and solidify during said operations.

As soon as a new electrode, which is only at room temperature, has been introduced into the slag layer, said electrode will strongly cool the slag layer in spite of the use of an auxiliary electrode so that the slag layer solidifies and at least temporarily does not fully perform its shielding and refining functions.

It is an object of the invention to avoid the disadvantage which has been described. In a process of the kind defined first hereinbefore, this object is accomplished in that each electrode is highly preheated at least at its end which is to be introduced into the slag layer before the electrode is introduced into the slag layer. The process according to the invention will now be described with reference to an apparatus which serves to carry out the process and which is diagrammatically shown in an elevation in the drawing. A depending electrode 1 consisting of the steel to be remelted depends from the arm portion 2, which is movable in a vertical direction and pivotally movable in a horizontal direction. The lower end portion 1' of the electrode 1 is introduced from above through the opening 4 into the inner chamber 3' of the furnace 3 and is then heated with the aid of the burners 5, which are supplied, e.g. with natural gas and preferably directed toward the electrode 1. The lower end portion 1' of the electrode 1 is thus preheated to a temperature which is not below a temperature that is 300° C. below the melting temperature of the electrode. The electrode 1 is then pulled out of the furnace 3 and is introduced into a known liquid-cooled mold, not shown, and is fused down in the same under a slag layer by the heat which is generated by the electric current flowing through the electrode 1.

Those end portions of the electrodes which are subsequently dipped into the slag layer may be preheated by different means, e.g. with the aid of an electric arc which is produced between the respective electrode and a preheating electrode. Alternatively, preheating may be effected by induction heating in that that end of the electrode which is to be fused down is inserted with that end which is to be preheated into a coil, through which flows alternating current preferably having a medium frequency and which is carried, e.g. by a carriage.

Compared to the mode of operation which has previously been employed in the electric slag refining of metals, the process according to the invention has the very important advantage that a cooling and solidification of the slag layer, whereby the shielding and refining actions of the slag layer are at least temporarily reduced, by the introduction of a new electrode into the mold is reliably avoided. Another advantage of the process according to the invention resides in that the preheating dries the electrodes so that the dissolved hydrogen content of the steel ingots produced by the remelting operation is much reduced. A high content of dissolved hydrogen would substantially reduce the quality of such ingots.

We claim:

1. In a process for electro slag remelting of metals, in which electrodes consisting of metal to be remelted are successively and separately melted in an ingot mold, which is fluid-cooled, under a layer of slag by the development of heat by the electric current fed through the electrodes, the improvement which comprises preheating at least one end of each electrode to an elevated temperature substantially above ambient temperature before the introduction of the electrode into the mold, and while said end of the electrode is at said elevated temperature introducing said heated end of the electrode into the mold through the slag layer, and then passing electrode-melting current through the electrode.

2. A process according to claim 1 wherein each electrode is preheated to a temperature which at its maximum is about 300° C. below the melting temperature of the electrode.

3. A process according to claim 2, wherein the electrodes consist of steel.

4. A process according to claim 1 wherein the electrodes are melted down to stubs having a predetermined range of minimum lengths, the stubs are withdrawn from the mold, and are replaced in the mold by a new, preheated electrode.

5. A process according to claim 1 wherein the electrodes are preheated in a furnace separate and spaced from the mold.

6. A process according to claim 4, wherein the metal in the mold and the slag layer thereover are heated by an auxiliary electrode during the absence from the mold of an electrode being melted therein.

UNITED STATES PATENT OFFICE
CERTIFICATE OF CORRECTION

Patent No. 3,546,349      Dated December 8, 1970

Inventor(s) Karl Swoboda & Otmar Kleinhagauer

It is certified that error appears in the above-identified patent and that said Letters Patent are hereby corrected as shown below:

In the claims: Claim 2, column 2, line 39, change "maximum" to --minimum--.

Signed and sealed this 12th day of November 1974

(SEAL)
Attest:

McCOY M. GIBSON JR.      C. MARSHALL DANN
Attesting Officer      Commissioner of Patents